United States Patent

[11] 3,568,760

| [72] | Inventor | Joseph E. Hogel<br>River Grove, Ill. |
|---|---|---|
| [21] | Appl. No. | 808,161 |
| [22] | Filed | Mar. 18, 1969 |
| [45] | Patented | Mar. 9, 1971 |
| [73] | Assignee | Honeywell Inc<br>Minneapolis, Minn. |

[54] OPTIMIZATION SYSTEM
17 Claims, 4 Drawing Figs.

[52] U.S. Cl. .................................................. 165/22,
236/1, 236/82
[51] Int. Cl. ................................................... G05d 23/185,
F24f 3/08
[50] Field of Search ....................................... 236/1 (B),
1 (C), 13, 78 (A), 821; 165/22, 2 (Q);
137/(Inquired); 340/414; 307/39

[56] References Cited
UNITED STATES PATENTS

| 2,196,687 | 4/1940 | Steinfeld | 236/78X |
| 2,304,124 | 12/1942 | Sampsel | 236/78X |
| 2,560,829 | 7/1951 | Stewart | 340/414X |
| 2,815,500 | 12/1957 | Hance et al. | 340/414 |
| 3,154,247 | 10/1964 | Carlson | 236/1X |
| 3,300,649 | 1/1967 | Strawn | 236/1X |
| 3,462,078 | 8/1969 | Houchman | 236/78X |

*Primary Examiner*—William E. Wayner
*Attorneys*—Lamont B. Koontz, Francis A. Sirr and John S. Summers ABSTRACT: A pneumatic system for controlling the temperature of a plurality of zones in an optimum manner. Each zone has a thermostat that controls a damper within the zone to regulate the flow of conditioned air to the zone. The output of each thermostat is connected to a pressure selector, and the pressure signal representing the greatest deviation from the desired condition in a zone is transmitted to an optimizing relay that controls the conditioned air temperature. The relay is constructed and arranged so that in a warm air system the conditioned air temperature is not increased until the damper in the zone of greatest deviation has reached a maximum flow position.

INVENTOR.
JOSEPH E. HOGEL
BY
ATTORNEY.

INVENTOR.
JOSEPH E. HOGEL
BY
ATTORNEY.

OPTIMIZATION SYSTEM

The invention is directed to a control system for optimizing the supply of conditioned air to a plurality of zones.

One type of multizone system consists of a pair of circulating air ducts, one for heating and one for cooling, each having an outlet in every zone. A heat exchanger is centrally disposed in each of the air ducts and appropriately connected to a source of heating or cooling medium. Each heat exchanger has a valve for controlling the flow of medium therethrough, the valve position being controlled as a function of temperature within the zones.

The entrance of conditioned air into a zone is regulated by a zone thermostat operably connected to a damper located at each zone outlet. The dampers operate in complementary fashion, that is, when one is open the other is closed and vice versa.

Air taken into the system is divided and directed into the two ducts, part being heated and part being cooled by the heat exchangers, and is then recombined in the zone to maintain a desired temperature. This can be wasteful in terms of operating expense since the mixed air temperature approximates the return air temperature, and the heated air must offset the cooled air or vice versa. Hence, the problem is how to control the flow and temperature of air to the zones in an optimum manner.

This invention solves the problem by supplying just enough heating or cooling to satisfy the zone which has the greatest demand and thereby supply more than enough heating or cooling for the other zones. This is accomplished by allowing the thermostatic signals indicative of greatest heating and cooling demand (i.e., greatest deviation from the desired condition in a zone) to control the heat exchanger valves so that the supply of heating or cooling media is not increased until the flow of conditioned air to the zones of greatest demand has reached a predetermined level.

DESCRIPTION OF THE PREFERRED EMBODIMENTS

Figure 1:
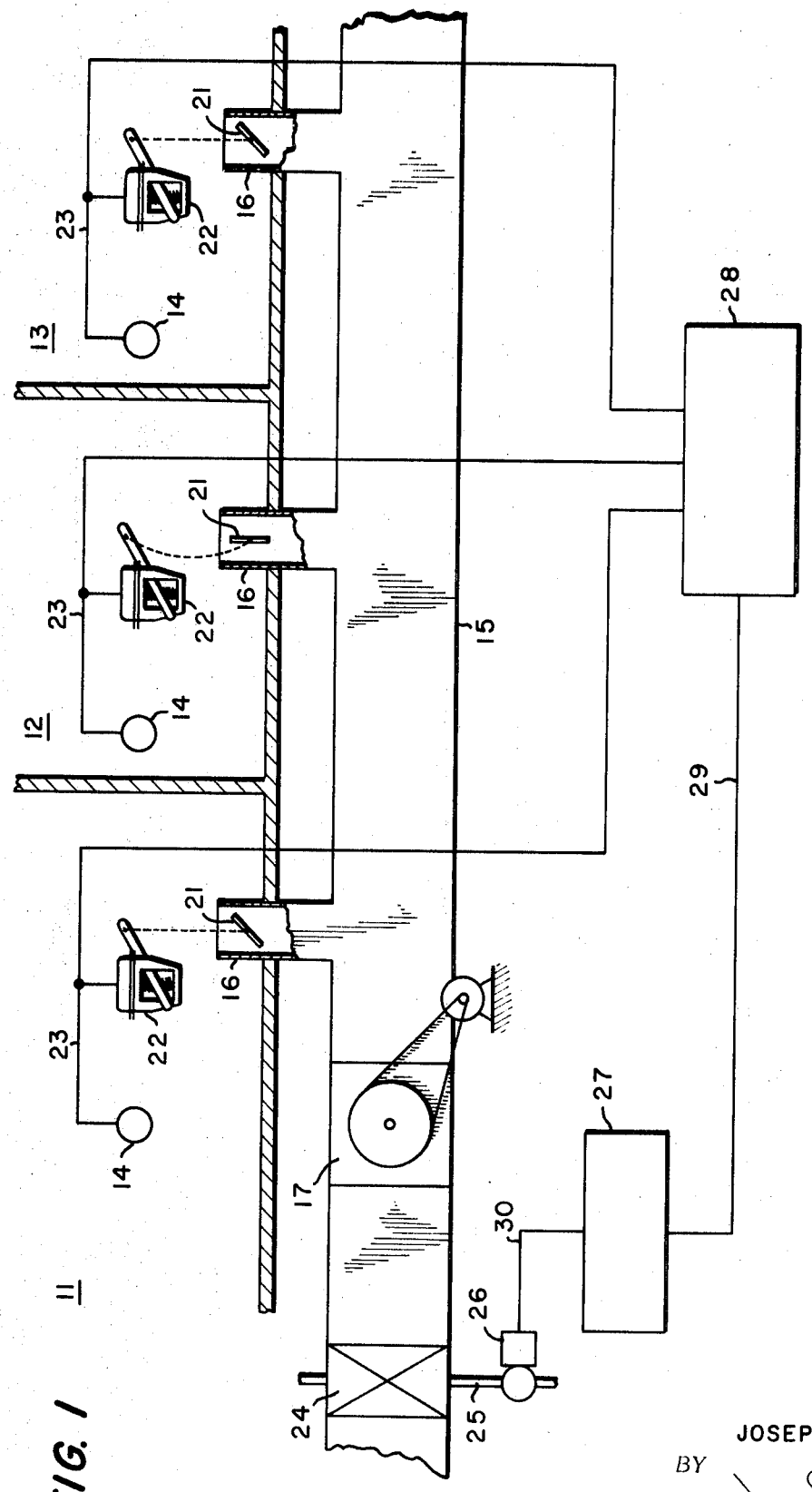
FIG. 1 is a schematic representation of a warm air multizone system employing the inventive concept.

FIG. 1 discloses zones 11, 12, 13 each of which has a pneumatic thermostat 14 for controlling the temperature in each zone at a desired setting. The source of conditioned medium to each of the zones 11, 12, 13 is warm air, supplied by an air duct 15 through outlets 16 located in each zone. A blower 17 causes air to flow in duct 15.

The flow of conditioned air to each of the zones is controlled by a damper 21 operably connected to a pressure responsive damper motor 22. The branch line pressure signal of each thermostat 14 is transmitted to the damper motor through a conduit 23 so that the position of damper 21 is established as a function of heat demand in a given zone.

The temperature of the air in duct 15 is controlled by a heat exchanger 24 that receives a supply of heating medium, such as hot water, through a pipe 25 from a source not shown. The flow of heating medium through heat exchanger 24 is controlled by a valve 26, whose position is governed by the output signal of an optimizing relay 27.

Each of the branch line pressure signals coming from thermostats 14 is transmitted through its respective conduit 23 to a pressure selector 28, which selects the pressure signal indicative of greatest deviation from the desired temperature in a zone and further transmits the selected pressure signal to the optimizing relay 27 through a conduit 29.

Figures 3, 4:
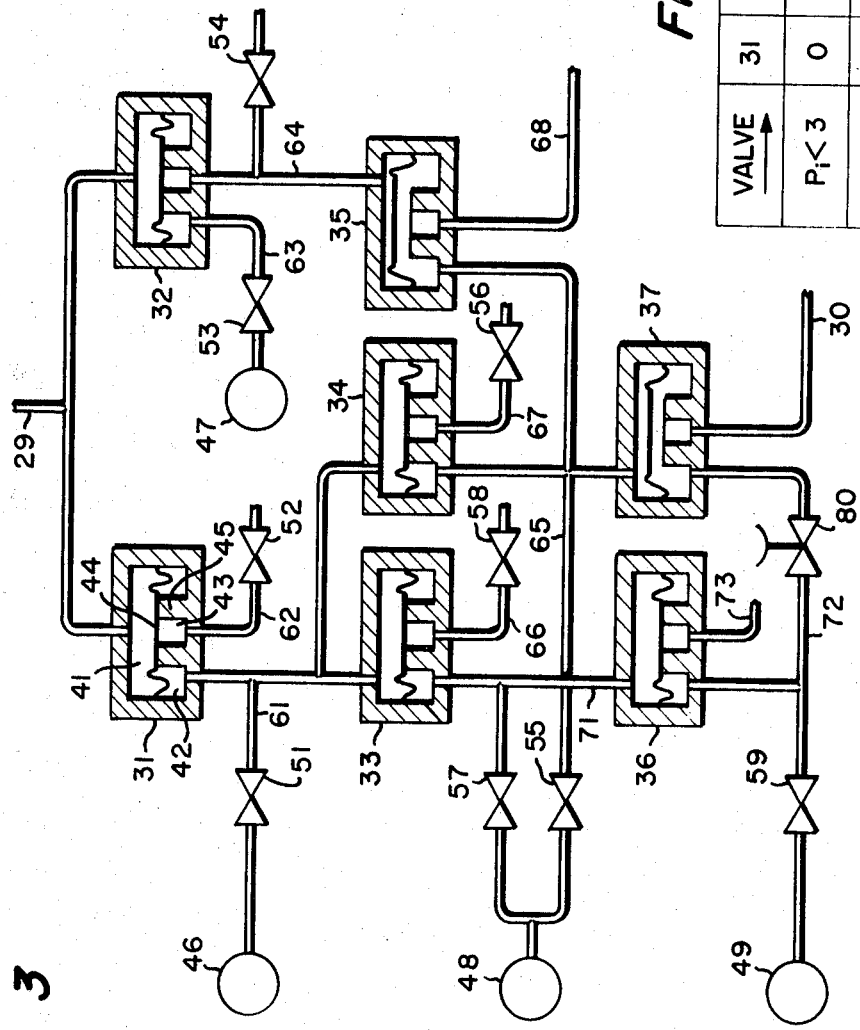
FIG. 3 is a schematic representation of an optimizing relay used in the embodiment of both FIGS. 1 and 2.
FIG. 4 is a truth table indicating operation of the optimizing relay.

Optimizing relay 27 is disclosed in detail in FIG. 3. It consists of seven pressure-responsive valves 31—37, each of which has a control chamber 41, an inlet chamber 42, and outlet chamber 43, a diaphragm 44 and an annular ridge 45 upon which diaphragm 44 seats. Numbers 41—45 are shown only with respect to valve 31, but like numbers apply to each of the other valves 32—37. When pressure admitted to control chamber 41 is great enough, diaphragm 44 seats on ridge 45 and prevents the communication of pressure between chambers 42 and 43.

The selected pressure from pressure selector 28 is transmitted to the control chambers 41 of diaphragm valves 31 and 32 by conduit 29 to serve as an input pressure to the relay 27.

Inlet chamber 42 of diaphragm valve 31 receives a supply of regulated pressure from a source 46 through a conduit 61 that includes a restriction 51. Conduit 61 is further connected to the control chambers 41 of diaphragm valves 33 and 34. A conduit 62 including a restriction 52 allows the pressure in outlet chamber 43 of diaphragm valve 31 to be vented to atmosphere.

The inlet chamber 42 of valve 32 receives a supply of regulated pressure from a source 47 through a conduit 63 having a restriction 53. Outlet chamber 43 of valve 32 is connected to the control pressure chamber 41 of valve 35 by a conduit 64, which is vented to atmosphere through a restriction 54.

A source 48 supplies regulated pressure through a restriction 55 and a conduit 65 to the inlet chambers 42 of valves 34 and 35, and to the control chamber 41 of valve 37. Outlet chamber 45 of valve 34 is vented to atmosphere through a conduit 67 and restriction 56, while outlet chamber 43 of valve 35 passes unrestricted to atmosphere through a conduit 68.

Regulated pressure supply 48 is also connected, through a restriction 57, to the inlet chamber 42 of valve 33, and through a conduit 71 to the control chamber 41 of valve 36.

Regulated pressure from a source 49 passes through a restriction 59 and a conduit 72 to the inlet chamber 42 of valve 36. Conduit 72 includes a variable restriction 80 upstream of its connection to inlet chamber 42 of diaphragm valve 37. Outlet chamber 43 of valve 36 passes unrestricted to atmosphere through a conduit 73, while conduit 30, which serves as the relay output, is connected to the outlet chamber 43 of diaphragm valve 37.

A typical operating range for the thermostats 14 of FIG. 1 is 0—16 p.s.i. as temperature increases. For such a range, the parameters relating to diaphragm valve 31 (FIG. 3) are chosen so that the valve closes when the input pressure in conduit 29 is 3 p.s.i. or greater. Similarly, diaphragm 32 is designed to close at 4 p.s.i. or greater.

FIG. 4 is a truth table showing operation of the valves 31—37 for given ranges of input pressure (Pi), and the resulting output pressure (Po). O and C refer to the open or closed position of each respective valve.

When the selected input pressure transmitted through conduit 29 is less than 3 p.s.i., valves 31 and 32 are open. Pressure from source 46 can therefore pass through restriction 51, conduit 61, inlet chamber 42 of valve 31, outlet chamber 43, conduit 62 and be vented to atmosphere through restriction 52. The pressure in conduit 61 is therefore low, allowing diaphragm valves 33 and 34 to open. By similar reasoning, it can be determined that diaphragm valve 36 is open thus allowing the pressure from source 49 to be vented directly to atmosphere through conduit 73.

With diaphragm valve 32 open, pressure from source 47 passes through restriction 53, conduit 63, the inlet and outlet chambers of valve 32, conduit 64 and on to the control chamber 41 of diaphragm valve 35 to close it. Restriction 54 bleeds to atmosphere at a negligible rate, and the pressure in conduit 64 remains high.

Valves 34 and 35 are arranged so that if either is open, the pressure in conduit 65 is vented to atmosphere thus allowing diaphragm valve 37 to open. While diaphragm valve 35 is closed at this time, it was stated above that diaphragm valve 34 is open and diaphragm valve 37 is therefore open.

Since conduit 30 is adapted for connection only with a pressure-responsive device, it follows that with diaphragm valves 36 and 37 open the pressure in conduit 30 will bleed backwards through the outlet and inlet chambers of diaphragm valve 37, conduit 72 (including adjustable restriction 80), the inlet and outlet chambers of diaphragm valve 36 and to atmosphere through conduit 73. As the truth table of FIG. 4 indicates, the output pressure in conduit 30 corresponding to an input pressure less than 3 p.s.i. has a decreasing characteristic.

If the input pressure in conduit 29 is greater than 3 p.s.i. but less than 4 p.s.i., valve 31 closes to increase the pressure in conduit 61 and thereby close valves 33 and 34. With the closing of of valve 33, valve 36 closes to prevent the venting of pressure in conduit 72 to atmosphere.

Since the input pressure is less than 4 p.s.i., valve 32 remains open and valve 35 is therefore closed. With valves 34 and 35 both closed, the pressure in conduit 65 is allowed to build up and close valve 37. This stops the communication of pressure between conduits 72 and 30, and pressure in the latter is therefore held constant as is indicated in the truth table.

With inlet pressure at 4 p.s.i. and higher, valves 31 and 32 are closed. Valves 33, 34 and 36 remain closed, but due to the closing of valve 32, pressure in conduit 64 bleeds to atmosphere through restriction 54 allowing valve 35 to open. Valve 37 is therefore open, and conduit 30 receives increasing pressure from source 49 as is indicated in the truth table.

Returning to FIG. 1, let it be assumed for purposes of explaining the operation that the pneumatic thermostats 14 and the optimizing relay 27 operate as described above, that the damper motors 22 have an operating range of 3 to 13 p.s.i., that dampers 21 are normally open, that pressure selector 28 selects the lowest pressure from conduits 23 and that valve 26 is normally open. With this apparatus, dampers 21 will be positioned by damper motors 22 to admit a required volume of warmed air in accordance with the branch line pressure signal from thermostats 14. The lowest branch line pressure signal, which represents the greatest heat demand or greatest deviation from the desired temperature in a zone, is selected by pressure selector 28 and transmitted by conduit 29 to optimizing relay 27. If the selected branch line pressure signal is 4 p.s.i. or greater, it follows from the above definition that the damper 21 in that particular zone is partially but not fully open. As indicated in the truth table of FIG. 4, an input pressure to optimizing relay 27 of greater than 4 p.s.i. gives rise to an increasing output pressure in conduit 30 and thereby tends to close valve 26. The heating medium passing through heat exchanger 24 is thus throttled, causing the air temperature in duct 15 to be decreased. Cooler air is therefore circulated to the zones, and this continues as long as the selected branch line pressure signal remains above 4 p.s.i. The air in duct 15 eventually reaches a degree of coolness such that when it enters the zone of greatest heat demand it causes the thermostat 14 located in that zone to generate a branch line pressure signal in conduit 23 of less than 4 p.s.i. At this point, the damper 21 in that zone approaches a wide open position (see zone 12 of FIG. 1). If the selected branch line pressure is less than 4 p.s.i., but greater than 3 p.s.i., the output pressure of optimizing relay 27 is held constant, thus holding the position of valve 26 constant. The degree of warmth of circulating air in duct 15 will remain the same so long as the branch line pressure signal from the zone of greatest heat demand remains in this range. However, should the heat demand increase until the signal pressure drops below 3 p.s.i., the damper 21 will move to its wide open position and the selected pressure transmitted through conduit 29 will give rise to a decreasing pressure in conduit 30, causing valve 26 to open and allow more heating medium to circulate through the heat exchanger 24. The circulating air in duct 15 is thus warmed until it causes the circuit branch line pressure signal to rise above 3 p.s.i.

Variable restriction 80 in conduit 72 of relay 27 (FIG. 3) is adjusted to make the response time of the air temperature varying portion of the system slower than the response time of any of the zones. This prevents the conditioned air temperature from causing an overshoot of the desired temperature in a zone and results in greater system stability.

The system cycles around the 3 to 4 p.s.i. selected signal pressure level, thereby keeping one of the dampers 21 in a substantially wide open position all of the time. This insures a barely sufficient supply of warmed air to the zone of greatest heat demand, and it follows that the zones of lesser heat demand are capable of receiving a more than adequate volume of warmed air.

Figure 2:
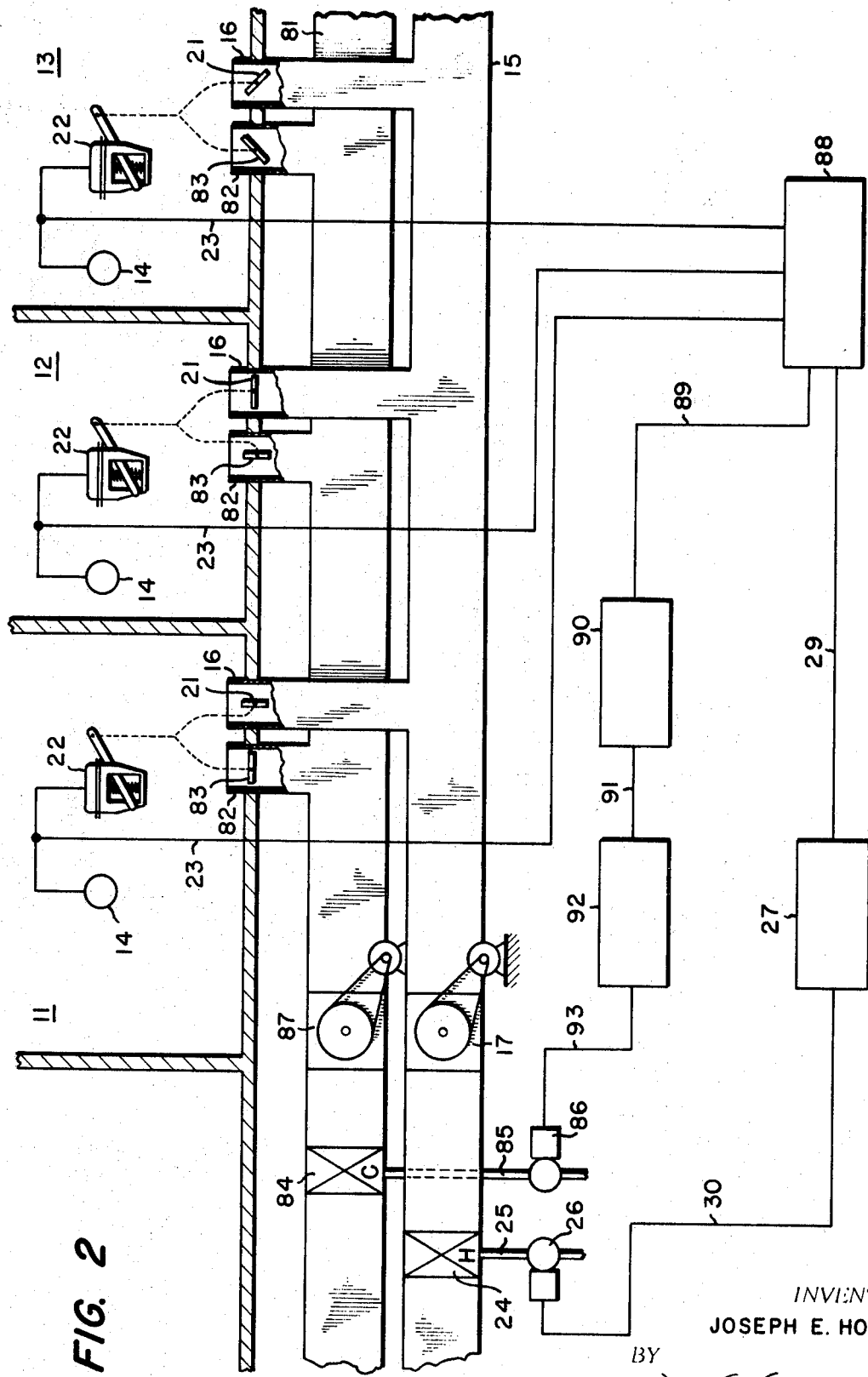
FIG. 2 is a schematic representation of a double duct multizone system employing the inventive concept.

FIG. 2 discloses the inventive concept employed in a double duct multizone system that mixes heated and cooled air to effect the desired temperature control. The same numerals are retained in FIG. 3, and the system further includes a second duct 81 for circulating cool air through openings 82 to the respective zones 11, 12, 13. Disposed in each of the openings 82 is a damper 83 for regulating the admission of cool air to a zone. Each of the dampers 83 is also mechanically linked to a damper motor 22 and arranged to operate in a complementary fashion with the warm air damper 21 in the zone.

Disposed in duct 81 is a heat exchanger 84 adapted for connection by a pipe 85 to a source of cooling medium, the flow of which is controlled by a valve 86. Duct 81 also includes a blower 87 for causing air flow to the zones 11, 12, 13.

Each of the branch line pressure conduits 23 is connected to a pressure selector 88 that again selects the lowest pressure to be transmitted through conduit 29 to optimizing relay 27, and which also selects the highest pressure which is transmitted through conduit 89 to an inverting or reversing relay 90. For an input pressure of 0—16 p.s.i., the inverting or reversing relay 90 generates an output pressure from 16—0 p.s.i. For example, if the input pressure is 3 p.s.i., the output pressure is 13 p.s.i.; if the input pressure is 11 p.s.i., the output pressure is 5 p.s.i., etc. The reversed or inverted pressure is transmitted through a conduit 91 to an optimizing relay 92 that is identical in structure to optimizing relay 27. The output of relay 92 is connected to cooling valve 86 by a conduit 93.

The system of FIG. 2 operates in the same manner as that of FIG. 1 but with the addition of the cooling function. The apparatus forming the heating portion remains the same. For the cooling portion valve 86 is normally open, the dampers 83 are normally closed and the critical pressure range (conduit 89) about which the cooling system cycles is 12-13 p.s.i. The branch line pressure signal that represents the greatest cooling demand in a zone selected and transmitted through conduit 89 to inverting or reversing relay 90.

If the selected pressure is less than 12 p.s.i., both dampers 83 and 21 in the zone of greatest cooling demand will be in a partially open position. This pressure signal is inverted to greater than 4 p.s.i. in conduit 91, and since the operation of optimizing relays 92 and 27 is the same the output pressure in conduit 93 increases and begins to close valve 86. This decreases the flow of cooling medium through heat exchanger 84 thus giving the air in duct 81 a lesser cooling effect. This is reflected by an increasing temperature in the zone of greatest cooling demand, and the pressure signal from the thermostat 14 in that zone begins to increase. When the pressure signal exceeds 12 p.s.i., the inverted signal causes relay 92 to hold the pressure in conduit 93 constant and valve 86 assumes a static position. At this signal pressure level, damper 83 opens wider and damper 21 approaches a more closed position. If the cooling demand continues, the pressure signal rises above 13 p.s.i., and the inverted signal causes optimizing relay 92 to bleed pressure from conduit 93 to open valve 86 and give the air in duct 81 a greater cooling effect. Damper 83 has at this time reached a wide open position while damper 21 is now closed (see zone 12 in FIG. 2). This will continue until the air in duct 81 becomes cool enough to satisfy the zone demand, and the cooling portion of the system will cycle around the 12-13 p.s.i. pressure signal range.

The heating portion of FIG. 2 operates the same as that of FIG. 1.

Optimization occurs in the double duct system of FIG. 2 because valve 26 begins to close whenever the selected low pressure (conduit 29) is 4 p.s.i. or greater, and valve 86 begins to close whenever the selected high pressure (conduit 39) is 12 p.s.i. or less. The zone of greatest heating demand cannot cause valve 26 to be opened until its hot and cold air dampers 21, 83 approach open and closed positions, respectively, and the zone of greatest cooling demand cannot cause valve 86 to be open until its dampers 21, 83 reach the opposite position. The zones of greatest demand are thus barely satisfied with their dampers in fully open and closed positions, while the remaining zones regulate the position of the dampers to obtain the proper mixture of air.

I claim:

1. A system for optimally controlling a physical condition in a plurality of zones, comprising:
    a source of medium capable of effecting a change in the condition;
    circulating means for circulating the medium to the zones;
    a plurality of flow-controlling means each of which controls the flow of medium to a zone;
    source-controlling means for controlling the source to vary the condition-changing capability of the medium;
    condition-sensing means in each zone for providing an output signal having a first range and a second range;
    means connecting the condition-sensing means to the flow-controlling means and to the source-controlling means;
    the flow-controlling means arranged to establish a predetermined flow of medium before the output signal of the condition-sensing means enters the second range; and
    the source-controlling means arranged to establish the condition changing capability of the medium in response to the output signal of the condition-sensing means in the zone of greatest deviation when the output signal is in the second range.

2. The system as defined by claim 1, wherein the source-controlling means is arranged to decrease the condition-changing capability of the medium in response to the output signal of the condition-sensing means in the zone of greatest deviation when the output signal is in the first range and to increase the condition-changing capability of the medium when said output signal is in the second range.

3. The system as defined by claim 2, wherein the output signals of the condition-sensing means have an intermediate range between the first and second ranges, the source-controlling means arranged to hold the condition-changing capability of the medium constant when the output signal of greatest deviation is in the intermediate range.

4. The system as defined by claim 3, wherein the flow-controlling means establishes a maximum volume of medium flow at the transition point between the intermediate and second ranges of the output signal.

5. The system as defined by claim 3, wherein the medium is temperature-conditioned air, the circulating means comprises an air duct joining the source of medium with each of the zones and a blower for causing air flow in the duct, and wherein the flow-controlling means comprises a damper operated by a damper motor.

6. The system as defined by claim 5, wherein the source-controlling means comprises:
    a heat exchanger disposed in the air duct and adapted for connection with a source of heat exchange medium;
    a valve for controlling the flow of heat exchange medium through the heat exchanger; and
    relay means responding to the output signal of greatest deviation, the relay means arranged to close the valve when the output signal is in the first range, to open the valve when the output signal is in the second range and to hold the valve at a constant position when the output signal is in the intermediate range.

7. The system as defined by claim 6, and further comprising means connected to each thermostat for selecting the thermostatic output signal representing the greatest deviation from the desired temperature in a zone, the selecting means being further connected to the relay means for transmitting the selected output signal thereto.

8. The system as defined by claim 7, wherein:
    the thermostats are pneumatic;
    the damper motors are pressure responsive;
    the selecting means is a pressure selector;
    the valve means is pressure responsive and normally open; and
    the relay means is pneumatic and arranged to supply pressure to the valve means when the selected pressure signal is in the first range, to exhaust pressure when the signal is in the second range, and to block the communication of pressure between the valve means and the relay when the signal is in the intermediate range.

9. A system for optimally controlling a physical condition in a plurality of zones, comprising:
    first and second sources of medium each capable of effecting a change in the condition;
    first circulating means for circulating the first and second media to the zone;
    like pluralities of first and second flow-controlling means each of which controls the flow of the first and second media to a zone respectively;
    first and second source-controlling means for controlling the first and the second sources to vary the condition-changing capabilities of the media;
    condition-sensing means in each zone for providing an output signal and controlling the respective first and second flow-controlling means in the zone in accordance with the deviation of the sensed condition from the desired condition in the zone, the output signal having a first range, a second range and a third range, the first range disposed between the second and third ranges;
    the first flow-controlling means being responsive to the output signal and arranged to establish a predetermined flow of first medium before the output signal enters the second range;
    the first source-controlling means connected to respond to the output signal of the condition-sensing means in the zone of greatest deviation in a first direction to decrease the condition-changing capability of the first medium when the output signal is in the first and third ranges, and to increase the condition-changing capability of the first medium the output signal is in the second range;
    the second flow-controlling means being responsive to the output signal and arranged to establish a predetermined flow of second medium before the output signal enters the third range; and
    the second source-controlling means connected to respond to the output signal of the condition-sensing means in the zone of greatest deviation in a second direction to decrease a condition-changing capability of the second medium when the output signal is in the first and second ranges, and to increase the condition-changing capability of the second medium when the output signal is in the third range.

10. The system as defined by claim 9, wherein the output signals of the condition-sensing means have a first intermediate range between the first and second ranges, the first source-controlling means arranged to hold the condition-changing capability of the first medium constant when the output signal of greatest deviation in the first direction is in the first intermediate range, and a second intermediate range between the first and third ranges, the second source-controlling means arranged to hold the condition-changing capability of the second medium constant when the output signal of greatest deviation in the second direction is in the second intermediate range.

11. The system as defined by claim 10, wherein:
    each of the condition-sensing means is connected to means for selecting the output signal representing the greatest deviation in the first direction from the desired condition in a zone, and for selecting the output signal representing the greatest deviation in the second direction from the desired condition in a zone;

the first named output signal being transmitted to the first source-controlling means; and the second named output signal being transmitted to the second source-controlling means.

12. The combination as defined by claim 11, wherein the physical condition is temperature, the condition-sensing means are thermostats, the first medium is warmed air, the second medium is cooled air, the first and second circulating means each comprises an air duct joining its respective source with each of the zones, each air duct having a blower for causing airflow therein, the first and second flow-controlling means each comprises a damper operated by a damper motor;

the first source-controlling means comprises:

a first heat exchanger disposed in the warm air duct and adapted for connection with a heating medium;

a first valve for controlling the flow of heating medium through the heat exchanger; and first relay means responsive to the output signal of greatest deviation in the first direction for closing the valve when that output signal is in the first, third or second intermediate range and opening the valve when that output signal is in the second range;

the second source-controlling means comprises:

a second heat exchanger disposed in the cooling air duct and adapted for connection with a cooling medium;

a second valve for controlling the flow of cooling medium through the second heat exchanger; and second relay means responsive to the output signal of greatest deviation in the second direction for closing the second valve when that output signal is in the first, second or first intermediate range and opening the valve when that output signal is in the third range.

13. The system as defined by claim 12, wherein:

the thermostats are pneumatic;

the damper motors are pressure responsive;

the selecting means is a high- and low-pressure selector;

the first and second valves are pressure responsive and normally open;

the first relay means comprises a first pneumatic relay arranged to supply pressure to the first valve when the selected pressure signal is in the first, third or second intermediate range, to exhaust pressure when the pressure signal is in the second range, and to block the communication of pressure to the first valve when the pressure signal is in the first intermediate range; and the second relay means comprises:

a pneumatic signal inverter having an input and an output, the input connected to the second transmitting means; and a second pneumatic relay connected to the signal inverter output and arranged to supply pressure to the second valve when the selected pressure signal is in the first, second or first intermediate range, to exhaust pressure when the pressure signal is in the third range, and to block the communication of pressure to the second valve when the pressure signal is in the second intermediate range.

14. The system as defined by claim 8, and further comprising an adjustable fluid restriction disposed between the pneumatic relay means and the pressure-responsive valve means for varying the response time of the valve means with respect to the first flow-controlling means.

15. In a pneumatic control system for optimally controlling a physical condition in a plurality of zones having a source of conditioned medium capable of effecting a change in the condition, circulating means for circulating the conditioned medium to each of the zones, a plurality of flow controlling means each of which controls the flow of medium to a zone, pneumatic condition-sensing means in each zone providing a pressure output having a first range, an intermediate range and a second range, the output being indicative of the deviation of the sensed condition from the desired condition, the pneumatic sensing means connected to control the respective flow-controlling means in the zone, pressure selector means for selecting and transmitting the pneumatic condition-sensing means pressure output representing the greatest deviation of the sensed conditions from the respective desired conditions in the zones, and source-controlling means including valve means for altering the condition-changing capability of the medium, the improvement comprising: relay means connected to receive the pneumatic condition-sensing means pressure output transmitted by the pressure selector means and arranged to supply pressure to the valve means when the selected pressure is in the first range, to block the communication of pressure between the valve and the relay means when the selected pressure is in the intermediate range, and to exhaust pressure when the selected pressure is in the second range and thereby to increase the condition changing capability of the medium.

16. The pneumatic control system according to claim 9, wherein the physical condition to be controlled is temperature and the pneumatic condition-sensing means are thermostats.

17. The system according to claim 15, wherein the flow-controlling means establishes a maximum volume of medium flow at a transition point between the intermediate and second ranges of the thermostatic output pressure.